(12) United States Patent
Backes

(10) Patent No.: US 7,894,054 B2
(45) Date of Patent: Feb. 22, 2011

(54) OPTICAL SENSOR DEVICE FOR DETECTING AMBIENT LIGHT

(75) Inventor: Ulrich Backes, Radolfzell (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 109 days.

(21) Appl. No.: 12/387,604

(22) Filed: May 5, 2009

(65) Prior Publication Data

US 2009/0284735 A1 Nov. 19, 2009

(30) Foreign Application Priority Data

May 16, 2008 (DE) ........................ 10 2008 023 845

(51) Int. Cl.
*G01N 21/00* (2006.01)
*G02B 6/26* (2006.01)

(52) U.S. Cl. .............................. 356/239.8; 250/227.24; 250/227.25

(58) Field of Classification Search .............. 356/239.7, 356/239.8, 445–448; 250/227.24, 227.25, 250/573

See application file for complete search history.

(56) References Cited

U.S. PATENT DOCUMENTS

| | | | |
|---|---|---|---|
| 5,661,303 A * | 8/1997 | Teder ........................ 250/341.8 |
| 5,704,544 A | 1/1998 | Samukawa et al. |
| 5,898,183 A * | 4/1999 | Teder .......................... 250/574 |
| 6,064,059 A | 5/2000 | Pientka et al. |
| 6,290,378 B1 | 9/2001 | Buchalla et al. |
| 6,750,832 B1 | 6/2004 | Kleinschmidt |
| 7,187,440 B2 | 3/2007 | Sautter et al. |
| 7,236,249 B1 | 6/2007 | Michenfelder et al. |
| 7,414,237 B2 | 8/2008 | Richwin et al. |
| 7,804,055 B2 * | 9/2010 | Backes ................... 250/227.25 |
| 2005/0045826 A1 * | 3/2005 | Barone ....................... 250/353 |
| 2007/0235638 A1 | 10/2007 | Backes et al. |
| 2008/0283782 A1 * | 11/2008 | Blaesing et al. ............. 250/573 |
| 2008/0284850 A1 * | 11/2008 | Blaesing et al. ............. 348/148 |
| 2008/0297803 A1 * | 12/2008 | Backes ....................... 356/445 |
| 2009/0032689 A1 | 2/2009 | Backes |
| 2009/0261237 A1 * | 10/2009 | Backes ................... 250/227.11 |
| 2010/0147067 A1 * | 6/2010 | Backes .................... 73/170.17 |

FOREIGN PATENT DOCUMENTS

| | | |
|---|---|---|
| DE | 19634774 | 3/1997 |
| DE | 19608648 | 10/1997 |
| DE | 19830120 | 2/1999 |
| DE | 19757821 | 7/1999 |

(Continued)

*Primary Examiner*—Hoa Q Pham
(74) *Attorney, Agent, or Firm*—Tarolli, Sundheim, Covell & Tummino LLP

(57) ABSTRACT

An optical sensor device for detecting ambient light is adapted to be coupled to a pane (10), in particular to a windshield of a motor vehicle. The optical sensor device has a sensor unit which includes at least one light receiver (26) and a lens plate (12). By means of the sensor unit, an ambient light beam having entered the pane (10) is coupled out of the pane (10) and directed onto the light receiver (26). On a surface (12*b*) which faces the pane (10), the lens plate (12) includes a first Fresnel prism structure (22) having a plurality of individual structures (24). The individual structures (24) of the first Fresnel prism structure (22) are designed such that they deflect the light beam at different angles.

15 Claims, 4 Drawing Sheets

FOREIGN PATENT DOCUMENTS

| | | |
|---|---|---|
| DE | 102004033734 | 2/2006 |
| DE | 102007036492 | 2/2009 |
| EP | 0838670 | 4/1998 |
| EP | 0974486 | 1/2000 |
| EP | 1068112 | 6/2004 |
| EP | 1647458 | 4/2006 |
| WO | 03026937 | 4/2003 |

* cited by examiner

_US 7,894,054 B2_

OPTICAL SENSOR DEVICE FOR DETECTING AMBIENT LIGHT

TECHNICAL FIELD

The invention relates to an optical sensor device for detecting ambient light, which is adapted to be coupled to a pane, in particular to a windshield of a motor vehicle.

BACKGROUND OF THE INVENTION

Sensor devices of this type are mainly used as light sensors for controlling the vehicle lighting. The use of traditional lenses to influence the beam path, such as, e.g., the lenses, inclined towards the windshield, of the rain sensor shown in EP 1 068 112 B1, requires a comparatively large amount of space.

The use of holographic structures allows to realize smaller designs, as known from, e.g., WO 03/026937 A1. These sensors are based on the principle of light diffraction with the aid of diffractive elements and therefore have the principle-induced drawback of a substantially lower useful luminous efficiency and a higher sensitivity to stray light.

In connection with an optical sensor device, DE 196 08 648 C1 proposes configuring the light entry and exit surfaces of the optical waveguide unit in the form of Fresnel lenses. But since the surfaces of the optical waveguide in which the lenses are configured are perpendicular to the surface of the pane, this device requires a very large amount of space.

Further basic disadvantages of known optical ambient light sensor devices are found in the high production expense and in a reception range which is too small. The attempt in connection with sensor devices having Fresnel lenses to expand the reception range in that the light receiver is placed further away from or closer to the focal point of the Fresnel lens is unsuccessful because this is accompanied by a splitting of the receiving characteristic into one or several further ray beams far out of the reception range provided. This also applies to the attempt to increase the receiver area.

It is an object of the invention to increase the reception range of the sensor unit while avoiding the aforementioned drawbacks.

SUMMARY OF THE INVENTION

According to the invention, an optical sensor device for detecting ambient light is adapted to be coupled to a pane, in particular to a windshield of a motor vehicle. The optical sensor device includes a sensor unit which has at least one light receiver and a lens plate. By means of the sensor unit an ambient light beam having entered the pane is coupled out of the pane and directed onto the light receiver. On a surface facing the pane, the lens plate includes a first Fresnel prism structure having a plurality of individual structures. The individual structures of the first Fresnel prism structure are designed such that they deflect rays of the light beam at different angles. The solution according to the invention permits to widen the reception range of the sensor unit in a defined manner by means of merely one Fresnel prism structure without a splitting into several light beams being produced. In order to obtain a desired reception characteristic, it is for example possible to adjust the angle of deflection of the reflecting individual structures about an average angle of deflection at small angular distances.

According to a particularly advantageous embodiment of the invention the first Fresnel prism structure includes a linear structure having a first orientation, and on the same surface the lens plate includes a second linear Fresnel prism structure having a plurality of individual structures, the second Fresnel prism structure having a second orientation which differs from the first orientation. In this way, the reception range widened when using the solution according to invention can be completed with a further reception range, independent thereof, in a different direction in space.

The orientation of the second Fresnel prism structure is preferably perpendicular to the orientation of the first Fresnel prism structure. It is thus possible to take the light incidence from two directions differing at maximum into account, which is important for the reliability of the light detection. However, further orientations are also basically possible.

As in the first Fresnel prism structure, the individual structures of the second Fresnel prism structure are preferably designed such that they deflect the rays of the light beam at different angles to thus increase the reception range.

A particularly compact sensor unit with minimum production expense is obtained in that the second Fresnel prism structure is at least partially integrated into the first Fresnel prism structure. In this case, the individual structures have a double function in that they conduct the necessary deflection of light simultaneously for both Fresnel prism structures.

In an advantageous embodiment of a rain/light sensor, there is provided, in addition to an optical sensor device for ambient light according to the invention, an optical rain sensor device for detecting wetting events on the pane, the sensor devices sharing a common lens plate in which all Fresnel structures (prism structures and possibly lens structures) are formed.

DETAILED DESCRIPTION OF THE PREFERRED EMBODIMENTS

Figure 1:
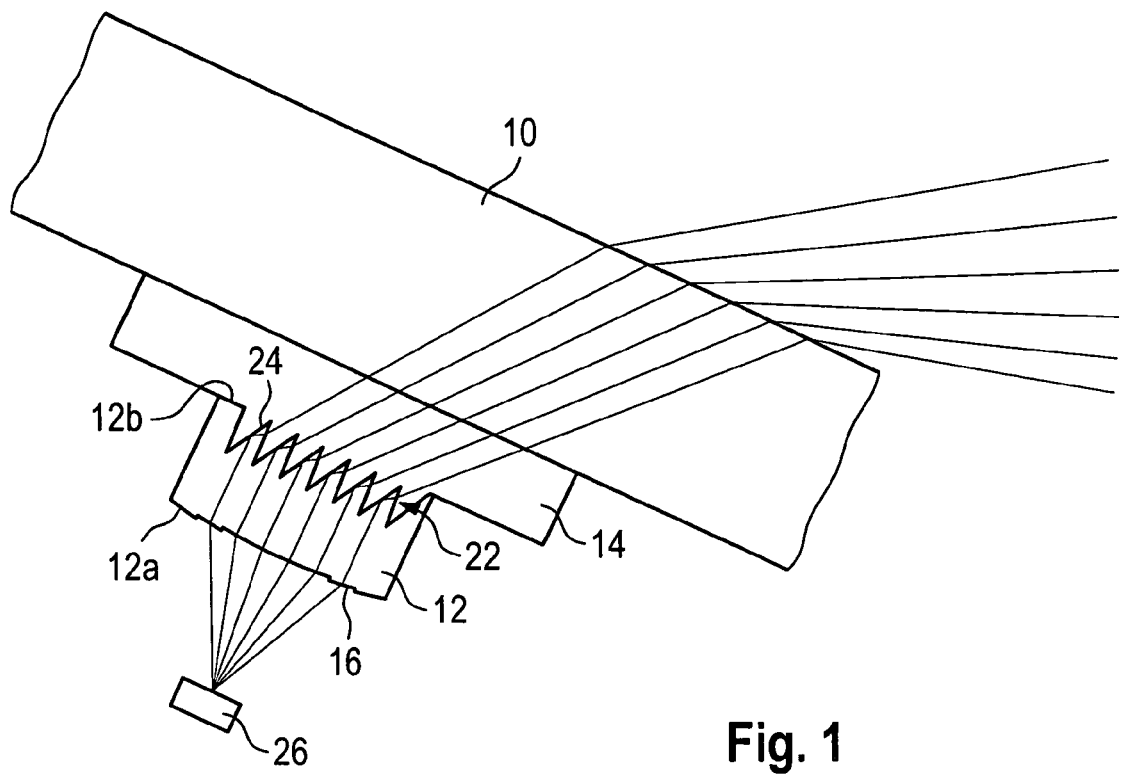
FIG. 1 shows a sectional view of a sensor unit of an optical sensor device according to the invention.

A sensor unit for an ambient light sensor for a vehicle is shown schematically in FIG. 1. The sensor unit is mounted to the windshield 10 of the vehicle. The optically active element of the sensor unit is a lens plate 12. The lens plate 12 is mechanically and optically coupled to the windshield 10 by means of a coupler 14.

On a first surface 12a which faces away from the windshield 10, the lens plate 12 is provided with a Fresnel lens structure 16. A light receiver 26 is located in the focal point of the Fresnel lens structure.

On a second surface 12b which faces the windshield 10, the lens plate 12 is provided with a Fresnel prism structure 22 arranged opposite to the Fresnel lens structure 16. The Fresnel prism structure 22 of the second surface 12b is comprised of a plurality of prism-like individual structures 24 which are explained in detail later.

A light beam impinging substantially horizontally on the inclined windshield 10 is refracted downwards at an angle when entering the pane 10. The light beam is coupled out of the pane 10 by the coupler 14 without significant refraction and impinges on the Fresnel prism structure 22 obliquely to the plane of the lens plate 12. The Fresnel prism structure 22 deflects the light beam such that it passes perpendicularly through the lens plate 12 in the form of a parallel light beam. The Fresnel lens structure 16 focuses the light beam on the light receiver 26 when it exits the lens plate 12.

Figure 2:
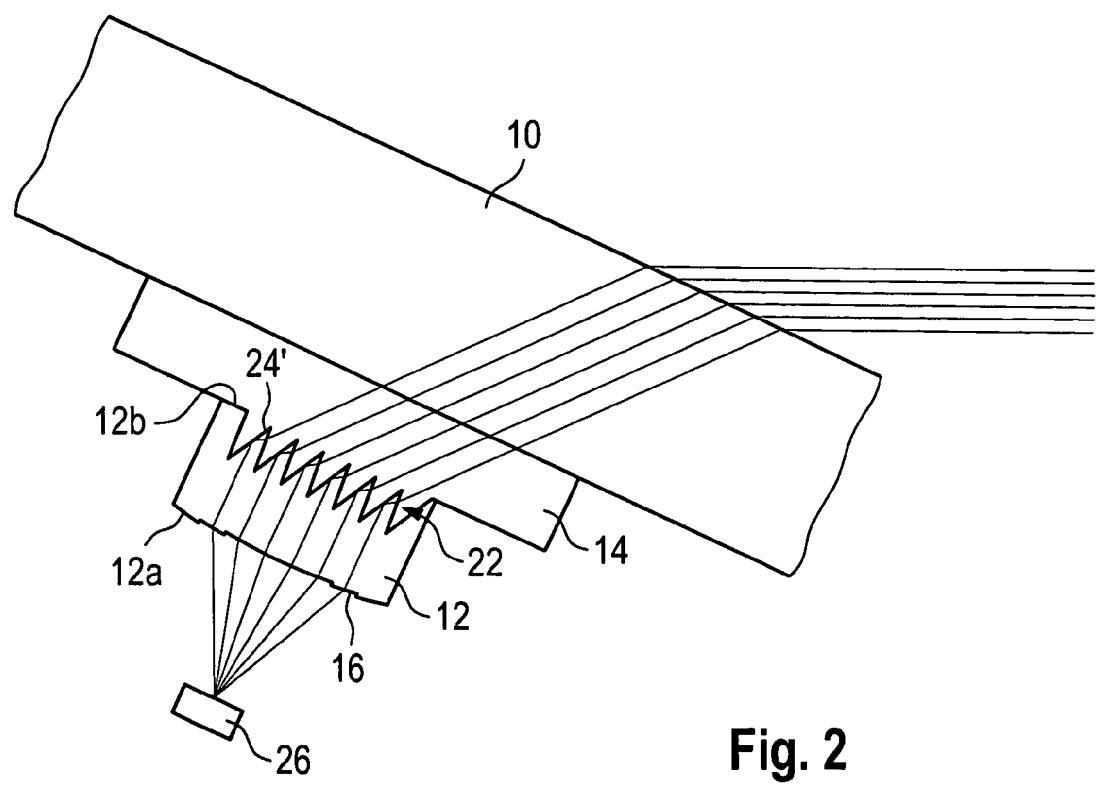
FIG. 2 shows a sectional view of a sensor unit of an optical sensor device not according to the invention.

A special feature of the Fresnel prism structure 22 is that in comparison with an embodiment of the Fresnel prism structure not according to the invention and shown in FIG. 2, the reception range of the sensor unit is widened. Whereas in the sensor unit shown in FIG. 2 the individual structures 24' of the Fresnel prism structure 22 all have the same design, merely a narrowly limited parallel light beam impinging horizontally on the windshield 10 is accordingly focused on the light receiver 26. In contrast thereto, the individual structures 24 in the embodiment of the Fresnel prism structure 22 according to the invention are designed such that they deflect the light beam at different angles as explained below with reference to FIGS. 3a and 3b and 4a to 4c. As a result, as apparent from FIG. 1, the reception range is not limited to a parallel light beam but widened to a light beam slightly converging with respect to the direction of incidence.

Figure 3A:
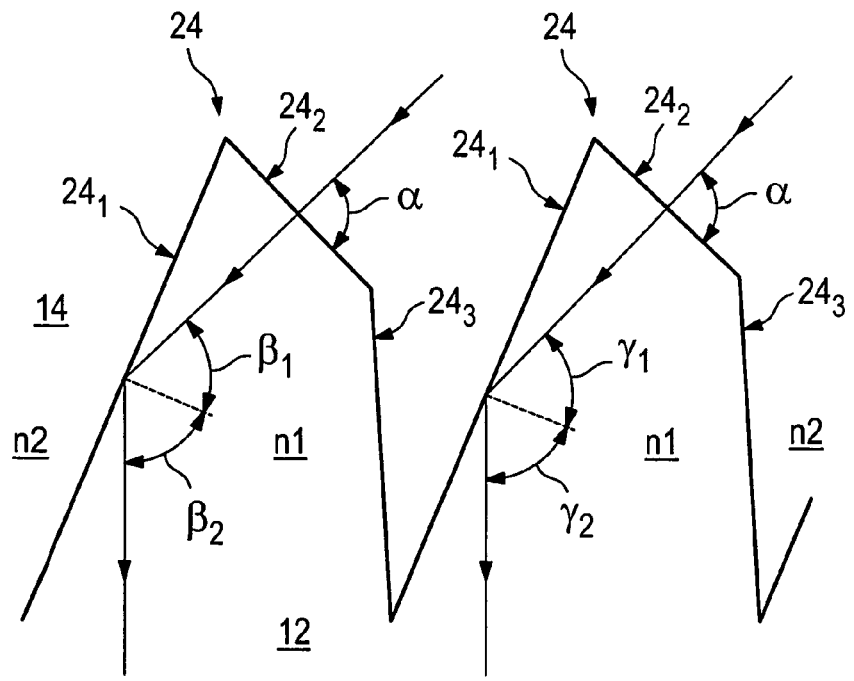
FIG. 3a shows an enlarged cross-sectional view of a Fresnel prism structure in which deflection occurs mainly by reflection.

It is apparent from FIG. 3a that the prism-like individual structures 24 of the Fresnel prism structure 22 have in cross-section a first flank $24_1$ which extends continuously straight from the base to the apex; a second flank consists of two sections $24_2$ and $24_3$. The section $24_2$ of the second flank (on the right in FIG. 3a) is less steep than the second section $24_3$ which is also steeper than the flank $24_1$. The refractive indices n1 and n2 of the materials from which the lens plate 12 and the coupler 14 are made are carefully adjusted to each other (they differ from each other only slightly).

For the sake of simplicity, one individual light ray of a substantially horizontally oriented ambient light beam is respectively considered below, this light ray having entered the windshield 10 and impinging on the lens plate 12 after having passed through the coupler 14.

The light ray impinging on the section $24_2$ at an angle of entry of $\alpha=90°$ according to the left-hand half of FIG. 3a enters the individual structure 24 without refraction and is totally reflected by the flank $24_1$ within the individual structure 24. The condition for total reflection of the light ray at the flank $24_1$ is that the angle of incidence $\beta_1$ is larger than the arc sine of the ratio of the refractive indices. Since the ratio of the refractive indices differs only slightly from 1, the angle of incidence $\beta_1$ has to be relatively large (flat incidence of light). The angles at the flanks of the individual structures 24 are adapted to each other such that the angle of reflection $\beta_2$ (which according to the laws of total reflection is equal to the angle of incidence $\beta_1$) is exactly so large that the ray passes perpendicularly through the lens plate 12 (cf. FIG. 1).

The light ray incident on the section $24_2$ of the adjacent individual structure 24 also at an angle of entry of $\alpha=90°$ according to the right-hand half of FIG. 3a has substantially the same course as the light ray described above. This ray is also deflected such that it passes perpendicularly through the lens plate 12. However, the design of this individual structure 24 and in particular of its flank $24_1$ and its flank $24_2$ is chosen such that the conditions described above for such a deflection apply to a light ray which does not extend completely parallel to the light ray shown in the left-hand half of FIG. 3a before impinging on the windshield 10. The individual structures 24 therefore differ from each other with respect to the angle between the ray section exiting the coupler 14 and the ray section passing perpendicularly through the lens plate 12, which in the design of the individual structures 24 according to FIG. 3a is equal to the sum of the angle of incidence and the angle of reflection $\beta_1+\beta_2$ and $\gamma_1+\gamma_2$, respectively. However, this does not mean that the angles of deflection of all individual structures 24 have to be different.

Figure 3B:
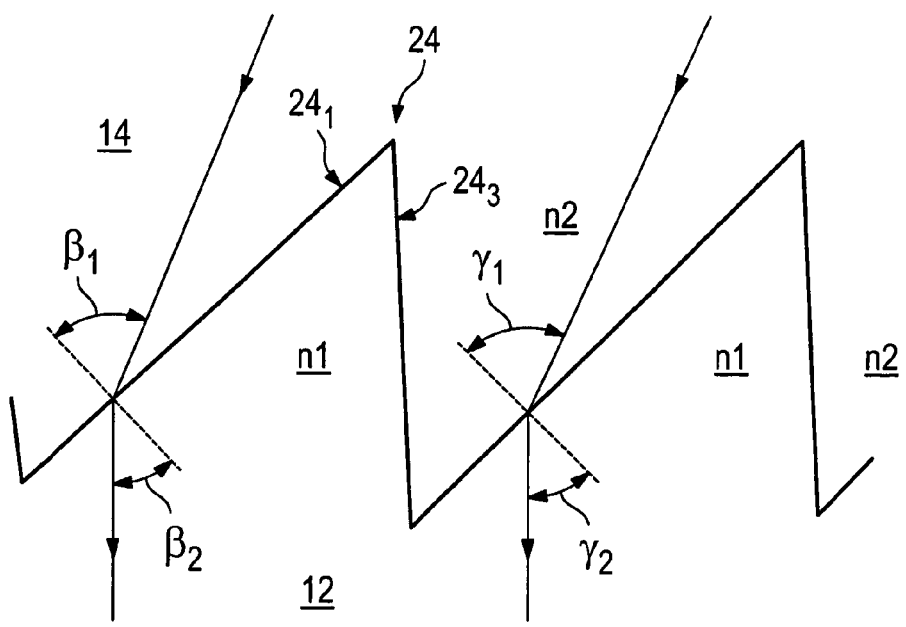
FIG. 3b shows an enlarged cross-sectional view of a Fresnel prism structure in which deflection occurs mainly by refraction.
Figure 4A:
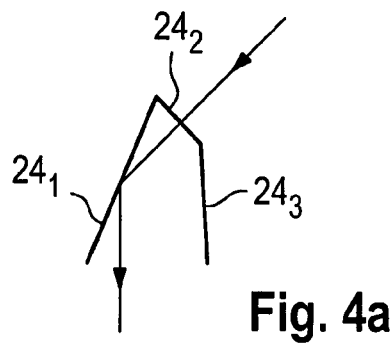
FIGS. 4a to 4d show corresponding cross-sectional views of different individual structures.
Figure 4B:
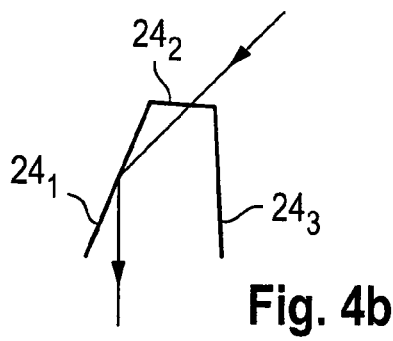
Figure 4C:
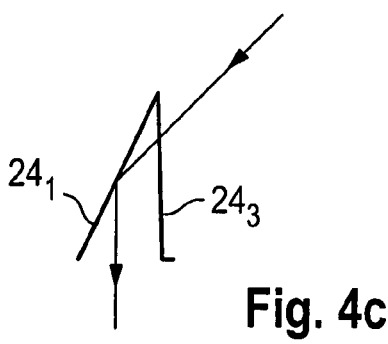
Figure 4D:
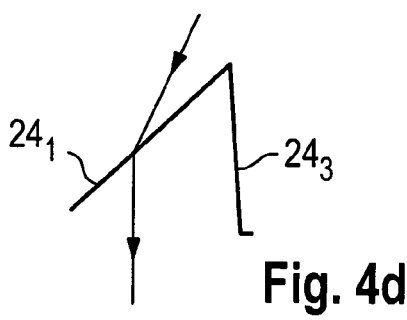

FIG. 3b shows a configuration having a purely refracting Fresnel prism structure. The prism-like individual structures 24 of the Fresnel prism structure 22 have in cross-section a first flank $24_1$ on which an incident light ray is deflected merely by refraction (without further reflection). Concerning the second flank, the intermediate section $24_2$ is omitted which is advantageous in particular in case of larger differences in the refractive indices. The angle of deflection defined above amounts here (according to the illustration of FIG. 3b) to $180°+\beta_2-\beta_1$ and $180°+\gamma_2-\gamma_1$, respectively, $\beta_1$ and $\gamma_1$ being the angles of incidence and $\beta_2$ and $\gamma_2$ being the angles of refraction.

Further configurations of the individual structures 24 are basically also possible, such as shown in FIGS. 4a to 4d by way of example. In the embodiments according to FIGS. 4b and 4c, a refraction of light occurs, in contrast to the embodiment of FIG. 4a, upon entrance into the individual structures 24 (at the flank section $24_2$), which may possibly be advantageous. In the embodiment according to FIGS. 4c and 4d, the section $24_2$ of the second flank is not present. According to FIG. 4c, the light ray is refracted at the second flank and reflected on the first flank $24_1$, whereas in FIG. 4d the light ray is refracted merely at the first flank $24_1$. A substantially symmetrical configuration of straight flanks is also possible (having the same inclination with respect to the plane of the windshield 10 or the lens plate 12 within a usual range of tolerance and taking the differences in the refractive indices of the lens plate 12 and the coupler 14 into consideration), as well as a combination of different individual structures 24 within the Fresnel prism structure 22. It is in any case important that the previously slightly converging light beam is generally converted into a parallel light beam by the Fresnel prism structure 22.

It has been shown that with a variation about the average deflection angle causing a light ray impinging horizontally on the windshield 10 to pass perpendicularly through the lens plate 12, an advantageous receiving characteristic is obtained. FIG. 1 shows the ambient light beam which is detected in this way by the light receiver 24 and is not completely parallel before deflection by the Fresnel prism structure 22. Depending on the design of the Fresnel lens structure 16, it is also possible to set a non-perpendicular course of the parallel light beam through the lens plate 12.

Figure 5A:
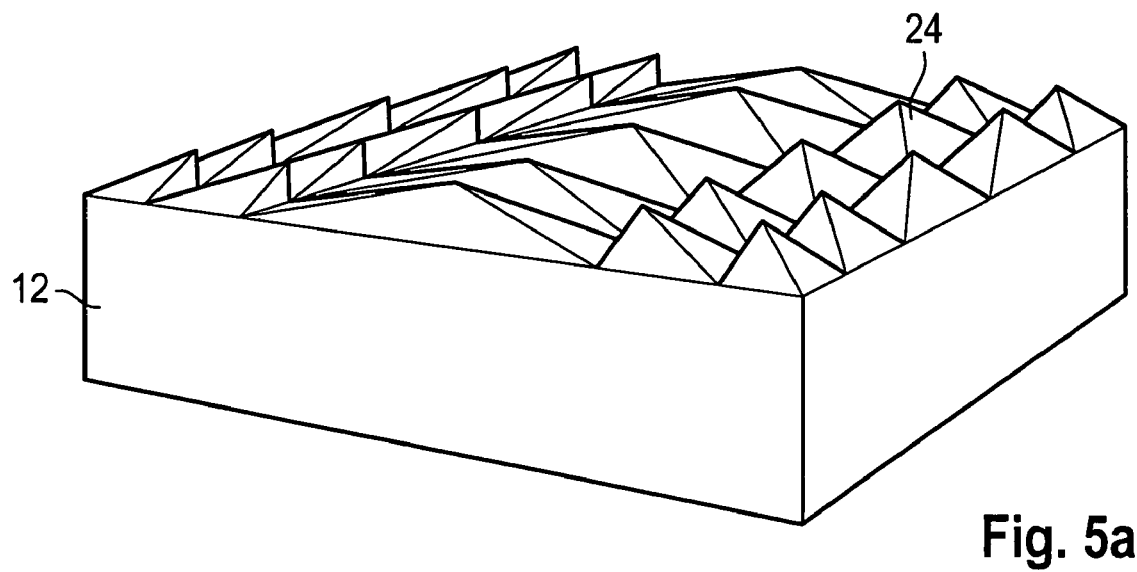
FIGS. 5a and 5b show perspective views of the Fresnel prism structure of a particular embodiment.
Figure 5B:
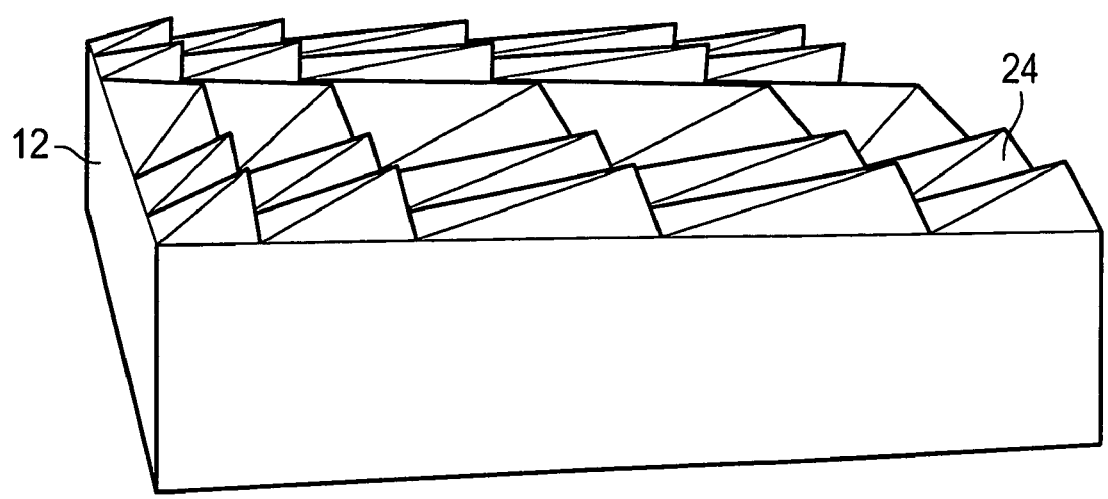

According to the illustration of FIG. 1, the Fresnel prism structure 22 is a linear structure having a specific orientation determined by the basic direction of the light beam reproduced on the light receiver 26. It is however apparent from the illustration of FIGS. 5a and 5b that the Fresnel prism structure 22 includes not only a first linear structure having a first orientation but additionally a second linear structure having a second orientation differing from the first orientation. In the embodiment illustrated, the second Fresnel prism structure is integrated into the first Fresnel prism structure, i.e. the individual structures 24 are configured in a three-dimensional manner such that they also deflect a light beam incident on the windshield 10 from a different direction in space such that it passes perpendicularly through the lens plate 12 and is focused on the light receiver 26 by the Fresnel lens structure 16 when it exits the lens plate 12. The orientation of the second Fresnel prism structure is perpendicular to the orientation of the first Fresnel prism structure, but further orientations are basically also possible. Concerning the individual structures 24, the second Fresnel prism structure is also preferably designed such that the individual structures deflect the rays of the light beam at slightly different angles.

For a perfect function of the sensor unit it is necessary for the material of the coupler 14 to be in contact with the surface of the prism structure 22 in a form-fitting manner and without the inclusion of air bubbles or similar.

In practice, combined rain/light sensors are required. A rain sensor includes a number of sensor units which, like the sensor unit of the described ambient light sensor, require active optical structures. Owing to the particular structure of the ambient light sensor, it is possible that the sensor units of the ambient light sensor and of the rain sensor share a common lens plate 12 so that a minimum space is obtained. If required, further sensor units can additionally be provided which receive light from different directions and/or have different receiving characteristics.

The lens plate 12 may be produced using a conventional injection molding technique. As an alternative, a stamping technique may be employed.

To avoid malfunctions caused by light being coupled in an undesirable fashion (stray light could for example be incident on the light receiver 26 via detours), at least part of the optically non-active surfaces of the lens plate 12 may be provided with refraction or reflection structures, for example retroreflective elements (so-called "cat's eyes"). This causes light which is not incident on the optically active surfaces to be deflected in "harmless" directions. Alternatively, or additionally, the optically non-active region may be provided on one side or on both sides with a printing that is impervious to light.

The invention claimed is:

1. An optical sensor device for detecting ambient light, which is adapted to be coupled to a pane, in particular to a windshield of a motor vehicle, the device having a sensor unit which includes at least one light receiver and a lens plate, the sensor unit coupling an ambient light beam, which has entered the pane, out of the pane and directing the light beam onto the light receiver, the lens plate including a first Fresnel prism structure on a surface which faces the pane, the lens plate having a plurality of individual structures, the individual structures of the first Fresnel prism structure being designed such that they deflect the light beam at different angles.

2. The optical sensor device according to claim 1, wherein the first Fresnel prism structure includes a linear structure having a first orientation, and wherein on the same surface, the lens plate includes a second linear Fresnel prism structure having a plurality of individual structures, the second Fresnel prism structure having a second orientation which differs from the first orientation.

3. The optical sensor device according to claim 2, wherein the orientation of the second Fresnel prism structure is perpendicular to the orientation of the first Fresnel prism structure.

4. The optical sensor device according to claim 2, wherein the individual structures of the second Fresnel prism structure are designed such that they deflect rays of the light beam at different angles.

5. The optical sensor device according to claim 2, wherein the second Fresnel prism structure is at least partially integrated into the first Fresnel prism structure.

6. The optical sensor device according to claim 1, wherein the lens plate is coupled to the pane by a coupler which contacts the Fresnel prism structure(s) in a form-fitting manner.

7. The optical sensor device according to claim 1, wherein the individual structures have inner surfaces on which rays of the light beam are reflected.

8. The optical sensor device according to claim 1, wherein the individual structures are sawtooth-shaped in cross-section, having second flanks at which part of the light beam enters, and first flanks at which a reflection occurs.

9. The optical sensor device according to claim 8, wherein a refraction of light at different angles occurs at the second flanks of the individual structures.

10. The optical sensor device according to claim 1, wherein the individual structures are sawtooth-shaped in cross-section, having first flanks at which a refraction of light at different angles occurs.

11. The optical sensor device according to claim 1, wherein on a surface which faces the light receiver, the lens plate has a Fresnel lens structure.

12. The optical sensor device according to claim 11, wherein the Fresnel lens structure reshapes a parallel light beam coupled out of the pane and passing through the lens plate into a converging light beam.

13. The optical sensor device according to claim 12, wherein the parallel light beam passes perpendicularly through the lens plate.

14. The optical sensor device according to claim 1, wherein a number of sensor units are provided which include a common lens plate.

15. A rain/light sensor, comprising an optical sensor device for detecting ambient light, which is adapted to be coupled to a pane, in particular to a windshield of a motor vehicle, the device having a sensor unit which includes at least one light receiver and a lens plate, the sensor unit coupling an ambient light beam, which has entered the pane, out of the pane and directing the light beam onto the light receiver, the lens plate including a first Fresnel prism structure on a surface which faces the pane, the lens plate having a plurality of individual structures, the individual structures of the first Fresnel prism structure being designed such that they deflect the light beam at different angles, the rain/light sensor further comprising an optical rain sensor device, the sensor device and the rain sensor device having a common lens plate.

* * * * *